A. W. Von Schmidt,
Rotary Meter,
N° 23,131. Patented Mar. 1, 1859
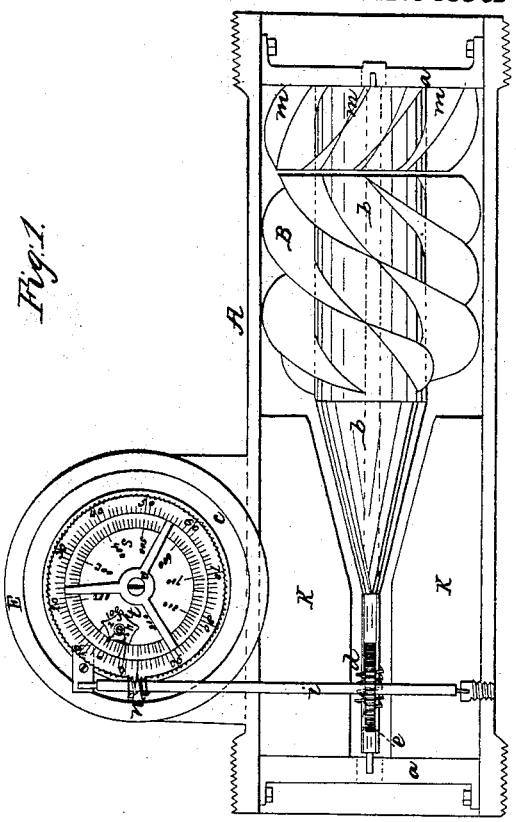
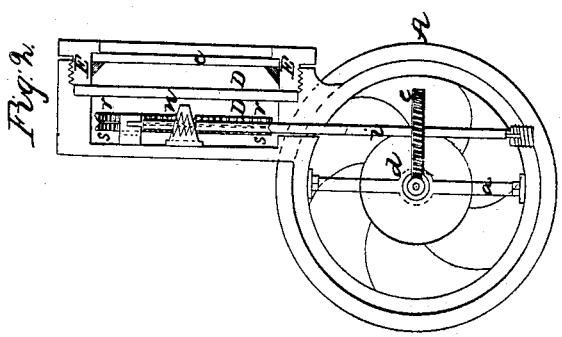
Witnesses.
Chas. J. Page
Wm. C. Harrison
Inventor
Alexey W. Von Schmidt

UNITED STATES PATENT OFFICE.

ALLEXEY W. VON SCHMIDT, OF SAN FRANCISCO, CALIFORNIA.

IMPROVED WATER-METER.

Specification forming part of Letters Patent No. 23,131, dated March 1, 1859.

*To all whom it may concern:*

Be it known that I, ALLEXEY W. VON SCHMIDT, of San Francisco, in the county of San Francisco and State of California, have invented an Improvement in Water-Gages; and I do hereby declare that the following is a full, clear, and exact description of the principle or character which distinguishes it from all other things before known, and of the usual manner of making, modifying, and using the same, reference being had to the accompanying drawings, of which—

Figure 1 is a longitudinal section; Fig. 2, a transverse section of the pipe, propeller, and indicator.

My invention consists in certain improvements in water-gages described as follows:

A represents a portion of the current water-pipe, within which I place a propeller, B, mounted upon an axis, $b$, the bearings of which are in cross-pieces $a\ a$. The propeller is of the scroll or screw form, and for present use the pitch of the screw has been calculated at three and three-fourth inches for a pipe two inches in diameter, and the hub or axis $b$ of this propeller is of hollow metal, so as to give it buoyancy, by which means the pressure and friction are taken off from its bearings to a great extent. Upon $b$ there is a worm or endless screw, $d$, which "takes" into the pinion $e$ on the indicator-shaft $i$. This shaft extends into the chamber D, in which is placed the indicating apparatus, shortly to be described. As water flowing in pipes has more or less whirl, it is necessary to counteract the whirl before it impinges upon the floats of the propeller, so as to have the full hydrodynamic force upon the propeller and indicate the true amount of water passing by the rotation of the propeller. For this purpose I fix in the tube two thin metallic feathers, $k\ k$, extending from the wall of the tube to near the axis $b$. These will intercept any whirl in the water and lead it with direct action onto the propeller, and in order to counteract the whirl after the water leaves the propeller, and also for the purpose of gaining the reaction of the water upon the propeller, I arrange a cylinder of fixed chutes, $m\ m$, as seen in Fig. 1.

The chamber D is open to water communication with pipe A, so that the whole of the indicating apparatus is immersed in water. This chamber is accessible by the screw-cap E, and this cap is furnished with a glass disk, $c$, through which the indicator may be inspected.

I do not confine myself to any particular kind of indicating apparatus; but the present one may be described as follows: The worm $p$ takes into the teeth of two dial-plates, $r\ s$, and the upper one of these, $r$, has one hundred teeth and the lower or back one has ninety-nine teeth, so that for every revolution of the wheel $r$ the wheel $s$ loses or drops back one tooth. On the surface of wheel $s$ is a small count-wheel, $t$, which is moved by the pin $x$ on wheel $r$ once in every back revolution of wheel $s$, and this count-wheel is furnished with five points or teeth. One revolution of wheel $r$ counts one hundred gallons of water, and one motion of the points on wheel $t$ indicates ten thousand gallons, and its entire revolution fifty thousand gallons. By reason of the immersion of the count-wheels and the whole machinery of the propeller and indicating apparatus in water, the parts move with very little friction, and it is only necessary to prevent by suitable means the introduction of dirt or obstructions to keep the apparatus always in working order.

Water-meters as usually constructed are expensive, and the principal points of advantage and economy in my meter are the immersion of the entire machinery in water and the placing the propeller and its accompaniments in the current-pipe, instead of an enlargement or extra chamber provided for that purpose.

I claim—

Combining with the propeller B the radial partitions or feathers $k\ k$ and the reacting chutes $m\ m$, said feathers and chutes being arranged and operating as herein set forth.

ALLEXEY W. VON SCHMIDT.

Witnesses:
CHAS. G. PAGE,
WM. H. HARRISON.